United States Patent [19]

Augusteijn

[11] Patent Number: 5,596,701
[45] Date of Patent: Jan. 21, 1997

[54] METHOD FOR AUTOMATICALLY RESTORING CONSISTENCY IN A HIERARCHICAL OBJECT STRUCTURE IN A COMPUTER AFTER A USER INTERACTION, AND COMPUTER COMPRISING SUCH A SYSTEM FOR AUTOMATIC CONSISTENCY RESTORATION

[75] Inventor: Alexander Augusteijn, Eindhoven, Netherlands

[73] Assignee: U.S. Philips Corporation, New York, N.Y.

[21] Appl. No.: 311,221

[22] Filed: Sep. 23, 1994

[30] Foreign Application Priority Data

Sep. 24, 1993 [BE] Belgium .................. 09301002

[51] Int. Cl.⁶ ................................. G06T 9/40
[52] U.S. Cl. ............................. 395/356; 395/133
[58] Field of Search ................... 395/133, 157, 395/158, 160, 62, 65

[56] References Cited

U.S. PATENT DOCUMENTS

| | | | |
|---|---|---|---|
| 4,631,690 | 12/1986 | Corthout et al. | 395/120 |
| 4,953,106 | 8/1990 | Gansner et al. | 395/160 |
| 5,179,718 | 1/1993 | MacPhail | 395/800 |
| 5,226,117 | 7/1993 | Miklos | 395/157 |
| 5,276,775 | 1/1994 | Meng | 395/55 |
| 5,283,898 | 2/1994 | Kusumoto et al. | 395/650 |
| 5,313,646 | 5/1994 | Hendricks et al. | 395/600 |
| 5,335,320 | 8/1994 | Iwata et al. | 395/155 |
| 5,361,349 | 11/1994 | Sugita et al. | 395/600 |
| 5,414,801 | 5/1995 | Smith et al. | 395/119 |
| 5,428,554 | 6/1995 | Laskoski | 395/550 |
| 5,430,870 | 7/1995 | Stanton et al. | 395/600 |

OTHER PUBLICATIONS

*Faison, Graphical User Interfaces with Turbo C++*, SAMS, 1991, pp. xix, xxii, xxiii, 68, 69, 249–251.
1990 ACM Eighteenth Annual Computer Science Conference Proceedings, 22 Feb. 1990, Washington, D.C., pp. 319–325; Ellis et al., "Extending the Behavioral Capabilities of the Object–Oriented Paradigm with an Active Model of Propag".

*Primary Examiner*—Heather R. Herndon
*Assistant Examiner*—Stephen Hong
*Attorney, Agent, or Firm*—Anne E. Barschall

[57] ABSTRACT

A reproduction structure in a computer is based on a hierarchical structure of consistency relations between objects. As a function of one or more objects of a given hierarchical level, each relation specifies one or more incremental objects at a next-higher level. Variable incremental objects are situated at the lowest level. After a user interaction, modifying one or more variable incremental objects, the consistency is restored as follows. First a set of value inconsistencies is signalled for the incremental objects during a bottom-up signalling step. Subsequently, on the basis of each element of said set during a top-down updating step the value of the hierarchically higher object is updated on the basis of a change of value, if any, of associated, specifying variable incremental objects and/or incremental objects.

19 Claims, 2 Drawing Sheets evaluator : f (a,b,c)
undo : f'(a,b,c)

METHOD FOR AUTOMATICALLY RESTORING CONSISTENCY IN A HIERARCHICAL OBJECT STRUCTURE IN A COMPUTER AFTER A USER INTERACTION, AND COMPUTER COMPRISING SUCH A SYSTEM FOR AUTOMATIC CONSISTENCY RESTORATION

FIELD OF THE INVENTION

The invention relates to a method for automatically restoring consistency in an information displaying structure in a computer after a user interaction, based on a set of objects in the hierarchical object structure thereof, the user interaction modifying one or more primary variable objects and subsequently secondary variable objects within the object structure being updated. The invention thus concerns a user interaction system or user interface, and in particular, such aspects that speed-up and/or render consistent the displaying as realizable on a physical platform. The most complex example thereof is formed, generally speaking, by a graphic interface because of the high degree of spatial parallelism of the presentations to the user, even though the invention can in principle also be used in other interfaces, for example interfaces with video images, sound and other means of expression. Said parallelism may also occur therein. Such an interface may be considered as an interaction between a user, generally a person executing actions so that the display is no longer consistent with the state of the system, and a process which subsequently restores the consistency.

BACKGROUND OF THE INVENTION

Restoration of consistency is conventionally implemented by means of so-called call-back functions as will be explained hereinafter. This approach is fully bottom-up and always the primary variable objects are successively updated first and immediately thereafter the secondary variable objects based thereon at successive hierarchically higher levels. This is realized by way of instructions which are locally present in the program and are executed immediately. In this type of organization it is not guaranteed on the one hand that all relevant consistency relations are addressed. On the other hand also superfluous consistency relations may be addressed, for example relations having implications only outside the current image field. This problem is caused by the fact that the consistencies must be restored without the relations being explicit, because use is made exclusively of all that is included in the program. This problem is notably significant when the interface operates with a changing program package, for example because the package is being developed, improved or maintained. As is known, all programs of some complexity are continuously subject to such modifications.

U.S. Pat. No. 4,631,690 discloses a multiprocessor system for forming a color image from objects defined in a hierarchical data structure. According to U.S. Pat. No. 4,631,690, the relevance of a given object to a given pixel is determined during a top-down step, because a representation must be found for all pixels. Evidently, this strategy also dictates the set-up of the object structure in which each object must have a reference to the next-higher level. This system utilizes bounding boxes which denote the dimensions of an object and which indicate the relevance to a given pixel.

FIG. 1 shows a general block diagram of a known computer. Therein, a distinction is made between the various functions which may be distributed in practice among the constituent sub-systems in a different manner. This diagram shows only three functions. First of all there is the data processing section, generally speaking performed by the processor 20. The processor receives user input from the keyboard 22, indicated diagrammatically. Other user information can be entered via a mouse, a speech input channel, a soft keyboard, and other means, which do not form part of the present invention per se. Furthermore, the processor outputs user information to the display screen, indicated diagrammatically, with associated control electronic circuitry 24. Other user information can be output via a speech output signal, specific indicators etc., which again do not form part of the present invention. In an abstract sense the user interaction system consists of the assembly of organizations in which the information input and output can cooperate with one another and with the execution of the data processing. Hereinafter, it will only be described how an instruction entered via a keyboard is translated into the updating of the image displayed.

FIG. 2 shows the conventional updating of a display. In this Figure, shown in abstract form, the data structure is represented by a triangle 26 and the screen by the indication 24; objects in the data structure are linked by hierarchical relations, each relation consisting of a coupling between one or more objects at a given level and one or more objects at a next-higher level or vice versa. The various hierarchical links between two objects may comprise the same numbers or different numbers of sub-links. It is assumed that a primary variable object is modified at a lowest level; this is symbolized by the arrow 32. A variety of events may be concerned: an object can be added, removed, displaced, and also its logic relations to other objects may be modified, e.g., added, canceled, assigned to another object. The modification of the relation may also relate to another level in the hierarchy, both for the primary variable object itself and for the relation. This summary is meant to provide a structure from which to understand the present invention, and is not limiting to the types of systems to which the present invention may be applied. Conventionally, the consistency is restored bottom-up in conformity with the direction of the arrow 28. The hierarchical relation of the object structure is implicitly present in the program, because the inverse relations between the various objects in the program have been made explicit. Therefore, during the execution, no investigation of the relations is performed; whatever relations are explicitly provided are executed directly: i.e. the updating of successively next-higher secondary variable objects. The effect of this updating is represented by the dark region. If updating encounters an object which need not be modified, all further explicitly provided modifications are still executed. This also occurs when an object is encountered which is not relevant to the image. Finally, after all necessary modifications have been made and the entire reproduction has been realized, the screen is fully updated to have its new appearance. It may be that updating is superfluous, because it has no effect on the reproduction: it may appear at a higher level, for example that the representations of the object lie outside the image. On the other hand, it may appear at a higher level that modifications at a lower level of the hierarchy are not necessary, whereas at a higher level influence would still be exerted. In the latter case the conventional method must still make everything explicit, illustrating that very likely errors are going to be made therein.

SUMMARY OF THE INVENTION

Therefore, it is inter alia an object of the invention to propose a method which automatically provides updating of the display in the situation of such an interface, and does so independently of further parts of the program package, in order to simplify the design, updating and maintenance thereof.

According to one aspect of the present invention, this is achieved in that the object structure comprises a network of consistency relations, each of which specifies one or more incremental objects as a function of one or more incremental objects and/or variable incremental objects at a next-lower hierarchical level, the real or emulated user interaction modifying one or more of such variable incremental objects at a lowest level, in that first during a bottom-up signalling step, a set of value inconsistencies for the incremental objects is signaled, and in that subsequently during a top-down updating step, on the basis of each necessary element of said set of value inconsistencies, the value of the associated incremental object is updated on the basis of a change of value, if any, of the associated specifying variable incremental objects and/or incremental objects at a lower hierarchical level. Therefore, each evaluation or update results in a subsequent object to be updated. In the above, the expressions "lower" and "higher" indicate mutually opposite directions. Alternatively, the objects may be interconnected in a cyclical structure, which would also cause the relations "higher" and "lower" to define such a cycle. In certain situation, this could render the display unstable, the change in the display by an earlier update thereby playing the role of a next user interaction, that is emulated, as it were.

Now, so-called incremental objects are defined as being linked to an expression which may be explicit or implicit and whose expression is arbitrary. For example, this expression may alternatively be given as a table. The so-called variable incremental objects are defined as being linked to a value which can be modified by a user interaction, or autonomously by the system, as described supra. The incremental objects, therefore, may depend not only on variable incremental objects but also on other incremental objects. The calculation thus takes place recursively. The modifications are implemented in two steps: first the inconsistencies are automatically signaled during a bottom-up step. Subsequently, the consistencies are automatically restored again during a top-down step.

The aforementioned U.S. Pat. No. 4,631,690 discloses a multiprocessor system for forming a color image from objects defined in a hierarchical data structure in which the relevance of a given object to a given pixel is determined during a top-down step, because a representation must be found for all pixels. In accordance with the present invention, the modifications of the incremental objects need be determined only as caused by such variable incremental objects which have indeed been modified. As stated above, the strategy of U.S. Pat. No. 4,631,690 also dictates the set-up of the object structure in which each object must have a reference to the next-higher level, Another difference with respect to U.S. Pat. No. 4,631,690 relates to the fact that the latter utilizes bounding boxes which denote the dimensions of an object and which indicate the relevance to a given pixel. In accordance with the present invention, however, the hierarchical relations are defined by means of equations. As a result, the invention can be applied to a much larger variety of objects and user interaction systems.

Updating in accordance with the present invention is implemented by means of a system of equations, the nature of this system being fully arbitrary. The invention is notably demand-driven: precisely those calculations are executed which are necessary to produce the correct user information, that is to say within the limitations given by the nature of the object structure, and neither more nor fewer calculations are carried out. The equations define consistency and in consequence, also indicate to what extent the consistency must be restored again. If an object is inconsistent, the system finds out which other objects or so-called callers at a higher level utilize the modified object, and the relevance is also determined at the relevant higher level. The structure of these callers will be described in detail hereinafter. Updating is effected only after the above search has been made.

In a preferred version, on the basis of a modification of a variable object, a part situated at the foot of the hierarchy is updated by direct calling from said modification, a boundary between the structure of the incremental objects and the directly updated part being formed by variable incremental objects. In some cases the latter organization can accelerate the process, provided that the risk that too few or too many operations are executed is low, in such a case where direct coupling exists between such a primary variable object and the secondary variable objects directly related thereto. For the "more remote" part of the structure the basic approach in accordance with the invention is then followed.

The present invention also relates to a computer comprising a system for automatic consistency restoration after a user interaction which is based on the foregoing.

It is therefore another object according to the present invention to provide a method of restoring consistency in which at least essentially each of said consistency relations is expressed by one associated equation.

It is still another object according to the present invention to provide a method for restoring consistency in which on the basis of a modification of a variable object a part situated at the foot of the hierarchy is updated by direct calling from said modification, and in which a boundary between the structure of the incremental objects and the directly updated part is formed by variable incremental objects.

It is a still further object according to the present invention to provide, as necessary, a method for restoring consistency in which incremental objects comprise a value field, a caller list, an environment field and an evaluator field, and an undo field, with variable incremental objects comprising only a value field and a caller list.

It is another object according to the present invention to provide a method for restoring consistency in which a closure object comprises only an environment field and an evaluator field.

It is still another object according to the present invention to provide a method for restoring consistency in which a side-effect incremental object comprises only a caller list, an environment field, an evaluator field and an undo field.

It is a further object according to the present invention to provide a method for restoring consistency for realizing said display structure for a visual display device.

Another object according to the present invention is to provide a method for restoring consistency wherein said display structure comprises at least one graph cycle, characterized in that for each cycle a lowest hierarchical level is defined, at such level an object is separated into an in-cycle incremental object and an out-of-cycle variable incremental object, and in that an external change is assigned to said variable incremental object as an initializing operation for said restoring.

It is another object according to the present invention to provide a method for restoring consistency for finding a fix point of a set of equations $xj=fj(x1 \ldots xn)$, $1 \leq j \leq n$, represented by said display structure.

The present invention also provides as an object to provide a computer provided with a system for automatic consistency restoration after a user interaction, comprising reproduction means for reproducing information on the basis of a set of objects in their hierarchical object structure of consistency relations which specify, each as a function of one or more variable incremental objects at a given hierarchical level, one or more incremental objects at a next-higher hierarchical level, the user interaction modifying one or more of such variable incremental objects at a lowest level, characterized in that said system comprises two-step control, i.e. for signalling a set of value inconsistencies for the incremental objects during a first, bottom-up signalling step, and for updating, during a subsequent, top-down updating step, on the basis of each necessary element of said set the value of the associated incremental object on the basis of a change of value, if any, of the associated specifying variable incremental objects and/or incremental objects at a lower hierarchical level.

BRIEF DESCRIPTION OF THE DRAWINGS

These and other aspects and advantages of the invention will be described on the basis of the preferred embodiments, with reference to the appended drawings, in which.

DETAILED DESCRIPTION OF THE PREFERRED EMBODIMENT

In accordance with the invention, not only the consistency of the user information output is automatically restored, but also the consistency of the entire data structure of an application in as far as it is relevant to the user information to be output, i.e. usually through the display screen. In such a data structure, consistency relations between different objects are represented by equations, for example by $a=f1(b,c)$. This equation forms part of a hierarchical structure by way of further equations, for example $b=f2(d,e)$; $g=f3(a,h)$; $k=f4(h,c,e)$. In such equations, the lefthand explicit object is on a higher level in the hierarchy than the righthand implicit objects. Of course, an expression like $b=f2(d)$ can be used as well. The image, or more generally speaking the reproduction, is then also defined as a function of the objects. The system of equations can be programmed directly. Another implementation is that a formalism for this system is set up and the machine comprises an appropriate translator.

Thus, when the consistency has ultimately been restored, the reproduction is also in conformity with the data structure. If the value of b or c changes, conventionally, the value of a must be calculated anew. If the value of, for example b changes due to an operation, the operation having changed b must also update the value of a again. This means that the programmer does not implement the natural consistency relation, but rather an inversion thereof, since the equation for a does not refer to expressions of a higher level at which objects occur whose value is determined by the value of a. Using the new technique described hereinafter, merely the relation $a=f1(b,c)$ is described and a given bookkeeping system is maintained as to whether the expressions in which a occurs are consistent or not.

Figure 1:
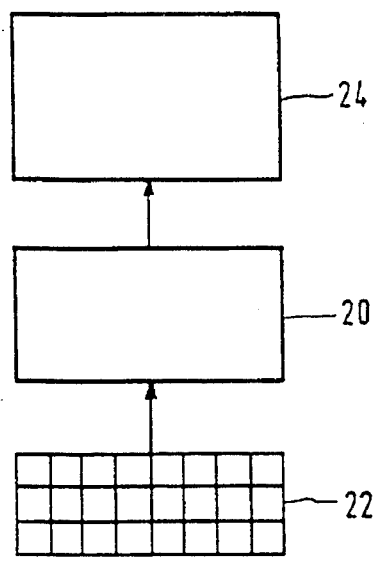
FIG. 1 shows a general block diagram of a computer according to the prior art.
Figure 2:
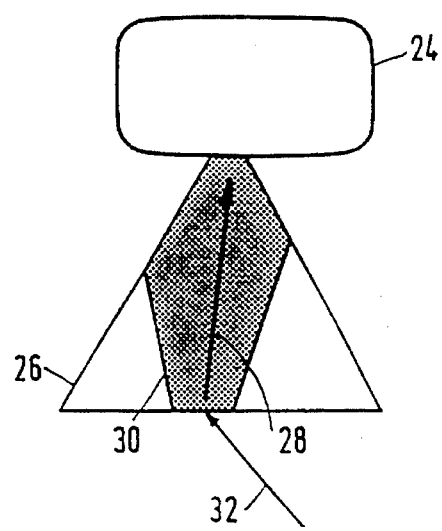
FIG. 2 shows the conventional updating of a display according to the prior art.
Figure 5:
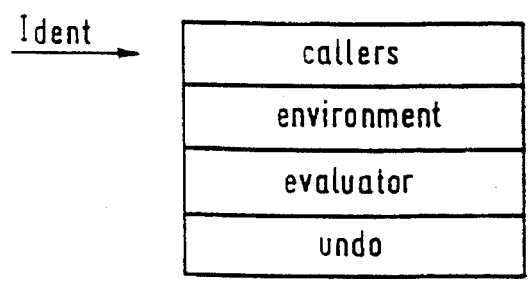
FIG. 5 shows the same for a side-effect incremental object.
Figure 6:
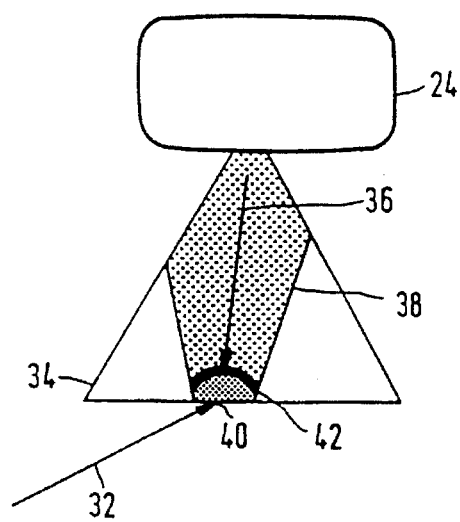
FIG. 6 shows the updating of a display in accordance with the invention.

The difference with respect to the conventional approach appears clearly from comparison of the FIGS. 2 and 6. The described bookkeeping system will be explained with reference to FIGS. 3 to 5.

The consistency is automatically restored by the so-called incremental evaluation. Therein, each object in the data structure, i.e. the above a ... k, is provided with additional data as follows. First of all there are incremental objects, being objects whose value is given by an expression as given above, e.g., a, b, g, k. Secondly there are variable incremental objects for which no such expression exists, e.g., c, d, e, h, but whose value may be modified, for example by a call-back function, by direct user intervention, or in another manner. Due to this modification, the incremental objects become inconsistent and must be recalculated until the consistency has been restored again.

Figure 3:
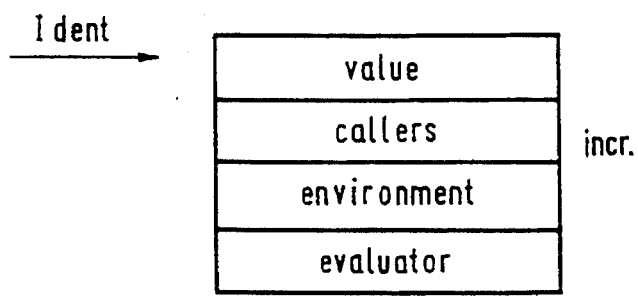
FIG. 3 shows an example of a notation for an incremental object.

FIG. 3 shows an example of a notation for an incremental object. The format actually present in the data structure has not been specified, because the invention is not influenced thereby. First of all, this incremental object has some kind of identification, for example a name or an address which can be called and which is indicated by an arrow "Ident". This object also has a value "value"; this value can be noted in any way compatible with the use of the relevant object, for example, as an integer, floating point number, file, etcetera. The object furthermore comprises a number of "callers" in a caller list, being identifications of other objects which used the current value of the relevant object in the last-valid consistent state in order to calculate their own value. An incremental object is locally consistent exclusively if evaluating its expression with respect to its environment yields a value that is equal to the actual value of the object in question, and the above environment itself is also locally consistent. The situation is globally consistent if all necessary objects (for example for effecting the display) are locally consistent. During the bottom-up phase the callers (c) are removed, as shown in detail in the annex. The value of the incremental object is calculated (evaluated) by means of the evaluator expression eval specified in the object. The set of objects required for this purpose is referred to as the environment env. The above examples for the expressions directly make this clear. Thus, for $a=f1(b,c)$: $evak=f1(x,y)$, whereas the environment $env:=\{x=b,y=c\}$. The value of an incremental object b for an object a is obtained by execution of the expression b.eval(b); therein, the "dot" indicates that the subsequent part of the expression is an attribute of the preceding part. As will become apparent hereinafter, a single expression may comprise a series of parts which are linked by dots. a is then added to b.callers and immediately thereafter b is locally consistent. If a is consistent, a.eval will not calculate f(b,c) again, but will directly produce the value a.value. The translation may be manually or automatically performed.

Figure 4:
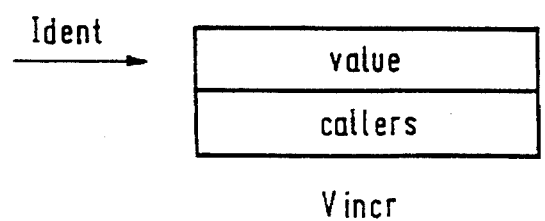
FIG. 4 shows the same for a variable incremental object.

FIG. 4 shows an example of a notation for a variable incremental object. This notation is partly in conformity with the notation of FIG. 3, but the evaluator expression for determining the value is absent. This is because the value is now determined by a call-back function, or directly by a user action. A further possibility consists in that the system itself initiates a change of value, for example under the influence of a built-in instability. For example, a simulation system for simulating motion of molecules may also have built in an expression for the inherent thermal movement which then remains continuously visible. In that case no inconsistency is possible at this level. Evidently, it may occur that the object structure is modified, for example in that a user created objects. On the other hand, the destruction of objects is not directly permitted. If necessary, this destruction can be realized by means of the so-called "garbage collection" technique which by itself is a known methodology.

It may be that direct recalculation of an object is less expensive in terms of processing effort than the bookkeeping by means of the structure given for incremental objects. In that case a closure object (Clos) can be defined. The latter object has the structure of an incremental object, but without the bookkeeping of callers and value; consequently, there are only an environment field and an evaluator field. It follows directly therefrom that it is never locally consistent in a sense that the value cannot be determined. Because there is no caller list for this object, the consistency cannot be detected. If a given incremental object a executes the evaluation of a Closure object b, which itself evaluates an incremental object c, it will be not object b, but object a which will be added to the set of callers of c.

FIG. 5 shows an example of a so-called side effect incremental object; this can be used, for example for the representation of an element to be reproduced on the display screen. If the element reproduced itself is static and must be updated so as to form another element, actually first the old representation must be removed and the new one may be formed only after that. A further particularity is that the relevant object has no value field. Therefore, this object comprises, as shown, an undo field which is always executed when the relevant incremental object has become inconsistent.

FIG. 6 shows the updating of a reproduction in accordance with the present invention. Like FIG. 2, it shows a display screen 24, a data structure 34, and an initial action 32 which causes a direct modification 40 of a primary variable object, which can be implemented in the same way as shown in FIG. 2. A number (zero or more) of secondary variable objects can thus be directly modified. The region in which these secondary variable objects are situated extends as far as a boundary region which is indicated as a band 42. The combined top-down/bottom-up method of restoring consistency according to the present invention has been implemented as from this boundary upwards. This has been indicated by a downwardly pointing arrow in contradistinction to the upwardly pointing arrow of FIG. 2. At the level of the boundary 42, the directly modified secondary variable objects are noted as variable incremental objects in the aforementioned manner. Subsequently, during a bottom-up signalling step it is first detected between which objects value-inconsistencies have arisen for the incremental objects (i.e. the objects which are not situated at the lowest level of the band 42); the result of the signalling step is a yes/no quantity. This is realized in that each modified object for each caller in its caller list accesses the associated object and also removes the relevant caller. Now, although the originating object may need to access various objects associated to its caller list in succession, for the originating object itself this is an indivisible operation, and hence the caller list will be empty thereafter. This continues for all objects which have been called by a caller from a hierarchically lower object until the top of the data structure has been reached. The inconsistencies are then known. After the signalling of the inconsistencies a recalculation is performed for all objects relevant to the user information to be output, which recalculation is executed by means of the equations which specify the respective consistency relations. The latter can be performed by way of a top-down approach as indicated by the arrow 36.

The sequence of the respective recalculations is arbitrary per se, but the organizational coherence is top-down because the consistencies to be restored can thus be determined. The other inconsistencies may simply continue to exist. For an object to be recalculated it can always be indicated when the underlying calculations have been completed; the associated callers are then always re-introduced, as apparent from a review of the Annex. The bottom-up phase commences notably with the variable incremental objects whose value has been amended. The top-down phase commences with the restoration of the consistency of directly displayed objects. The following Annex successively describes the bottom-up procedure, the top-down procedure, as well as the Closure element, and a side-effect incremental element.

In the bottom-up procedure, the definition of the operation make_icons on object x is given. The comment gives the result. In the top-down procedure, y is associated to the caller object, whereas x is being evaluated. The relation g(a,b,c) is used here, and in the remainder of the annex, only by way of example.

Figure 7:
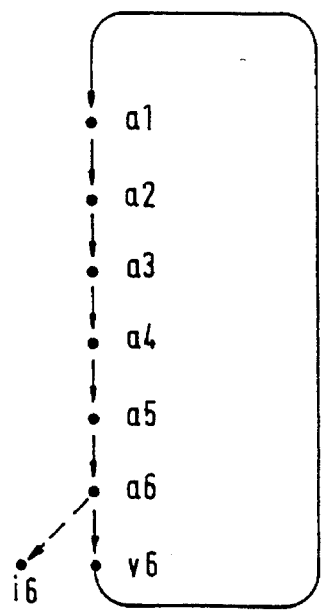
FIG. 7 illustrates a cyclical organization.

FIG. 7 illustrates a cyclical organization. An elementary case is realized when object a1 depends on object a2, object a2 depends on object a3, and so on until object a6 cyclically depends on object a1. As before, it is not necessary that each object depend on one other object. Through this structure, a stable as well as an unstable behavior can be governed. Of unstable structures, those that execute limited behavior, such as periodical, are of most interest, as compared to diverging behavior. The cyclical structure can be combined with non-cyclical elements.

An organization such as shown in FIG. 7 can be used to find the so-called fix point of a set of equations. For a single function f(x), the fix point is the solution of the equation x=f(x). For a set of equations $$x1=f1(x1 \ldots xn)$$

$$x2=f2(x1 \ldots xn)$$

$$xn=fn(x1 \ldots xn)$$

a fix point is a solution of the set. In this context, FIG. 7 is an elementary example of a cyclic graph, and the actual structure of a graph may be more complex, with a plurality of cyclic parts and non-cyclic parts. The fix point, if any, represents the limit solution, although periodic and diverging solutions may exist.

An attractive method for realizing a solution to these equations is the following: for each cycle one of the objects is split (as shown for object a6) into an incremental object in (here i6) and a variable incremental object vn (here v6). The latter one now represents the item that can undergo the change that was considered with respect to the display supra. The object v6 is given an initial value. The splitting by itself is conventional and based on the representations shown in FIGS. 3, 4. The solution method is now an iterative one, starting from assignment of the value of object i6 to object v6: this renders the system inconsistent. In respect of the foregoing, the solution now is straightforward. The assignment of the value of i6, which is recomputed since v6 has changed, is repeated until the value of v6 does not change any more. At that point a fix point has been reached.

ANNEX:

bottom-up

```
make_incons (X)
    := for each o ∈ x.callers
        make_incons (o)
        x.callers :=x.callers − {o}
    end
# comment x is inconsistent and x.callers = { }, which is the empty set
``` top-down

```
eval (xy)
:=  if x.callers≠ { } then x.callers := x.callers + {y} return (x.value) fi
    x.value :=   g(x. env.a . eval (x. env.a,x),
                    x. env.b . eval(x. env.b,x),
                    x. env.c . eval(x. env.c,x)
                );
x.callers := x.callers + {y}
return (x. value)
# comment x is consistent with a,b,c, : x=g(a,b,c)
        x.caller ≠ { }
```

Closure object

```
eval (x,y)
:=return g      (x. env.a. eval(x.env.a.y),
                x. env.b . eval(x. env.b,y),
                x. env.c . eval(x. env.c,y)
            );
```

Side-effect incremental object, g produces the effect
```
make_incons (x)
:=x . undo ( );
for the remainder the same as for a normal incremental object.
eval (x,y)
:=if x . callers ≠ { } then x.callers + {y}; return fi
    g(x. env.a . eval (x. env.a,x),
        x. env.b . eval (x. env.b,x),
        x. env.c . eval (x. env.c,x)
    );
x.callers := x.callers + {y}
```

What is claimed is:

1. A method for restoring logical consistency in an information display structure in a computer having a memory and a relevancy boundary of said information display structure, after an user interaction, based on a set of objects in a hierarchical object structure, said object structure comprising a network of logical consistency relations stored in said memory, each of which specifies one or more incremental objects as a function of objects lower in said hierarchical object structure selected from the group consisting of one or more incremental objects and one or more variable incremental objects at a next-lower hierarchical level, at least one of said logical consistency relations specifying one or more incremental objects as a function of less than all of said incremental objects and said variable objects, said relevancy boundary distinguishing objects within said relevancy boundary, a logical consistency of which is necessary to restore logical consistency of said information display structure, from those objects which are outside said relevancy boundary, a logical consistency of which is unnecessary to restore logical consistency of said information display structure, at least one of the group consisting of said incremental objects and said variable objects being outside said relevancy boundary, the user interaction initially causing modification of one or more of said variable incremental objects at a lowest level to create a logical inconsistency, and variable objects within said object structure being subsequently updated, said method comprising the steps of:

during a bottom-up signaling step, after said modification signaling a set of inconsistencies, based on the logical consistency relations, for values of said incremental objects at successively higher hierarchical levels;

during a top-down updating step, after said bottom-up signaling step, at successively lower hierarchical levels, on the basis of each element of said set of signaled inconsistencies updating values of at least each associated incremental object within said relevancy boundary, so that logical consistency is selectively restored within said relevancy boundary to said information display structure, based on a change of value of said lower objects of said function; and outputting said updated information display structure.

2. A method as claimed in claim 1, in which said logical consistency relations are each expressed as an associated equation.

3. A method as claimed in claim 1, in which a user interaction results in a modification of a variable object, a subset of said objects including a lowest hierarchical level being updated directly on a basis of said modification, a boundary between said incremental objects being updated in said top-down updating step and said updated directly objects being formed by variable incremental objects.

4. A method as claimed in claim 1, in which incremental objects comprise a value field, a caller list, an environment field and an evaluator field, and wherein variable incremental objects consist essentially of a value field and a caller list.

5. A method as claimed in claim 4, in which at least one incremental object comprises a closure object consisting essentially of an environment field and an evaluator field.

6. A method as claimed in claim 4, in which at least one incremental object comprises a side-effect incremental object consists essentially of a caller list, an environment field, an evaluator field and an undo field.

7. A method as claimed in claim 1, further comprising the step of presenting said display structure on a visual display device.

8. A method as claimed in claim 1, wherein said display structure comprises at least one recursive graph cycle, characterized in that for each recursive graph cycle a lowest hierarchical level is defined, an object at said lowest hierarchical level being separated into an incremental object within said recursive graph cycle and a variable incremental object outside said recursive graph cycle, said user action resulting in a modification of said variable incremental object outside said recursive graph cycle.

9. A method as claimed in claim 8 for finding a fix point solution of a recursive set of equations $xj=fj(x1 \ldots xn)$, $1 \leq j \leq n$, represented by said display structure, wherein $xj$ represents the value of an object within said cycle and n is the number of objects within said cycle.

10. A system for restoring logical consistency in an information display structure in a computer having a memory and a relevancy boundary of said information display structure, after an user interaction, based on a set of objects in a hierarchical object structure, said object structure comprising a network of logical consistency relations stored in said memory, each of which specifies one or more incremental objects as a function of objects lower in said hierarchical object structure selected from the group consisting of one or more incremental objects and one or more variable incremental objects at a next-lower hierarchical level, at least one of said logical consistency relations specks one or more incremental objects as a function of less than all of said incremental objects and said variable objects, said relevancy boundary distinguishing objects within said relevancy boundary a logical consistency of which is necessary to restore logical consistency of said information display structure, from those objects which are outside said relevancy boundary, a logical consistency of which is unnecessary to restore logical consistency of said information display structure, at least one of the group consisting of said incremental objects and said variable objects being outside said relevancy boundary, the user interaction initially causing modification of one or more of said variable incremental objects at a lowest level to create a logical inconsistency, and variable objects within said object structure being subsequently updated, said system comprising:

- means for, during a bottom-up signaling step, after said modification, signaling a set of inconsistencies, based on the logical consistency relations, for values of said incremental objects at successively higher hierarchical levels;

- during a top-down updating step, after said bottom-up signaling step, at successively lower hierarchical levels, on the basis of each element of said set of signaled inconsistencies, updating values of at least each associated incremental object within said relevancy boundary, so that logical consistency is selectively restored within said relevancy boundary to said information display structure, based on a change of value of said lower objects of said function; and

- means for outputting said information display structure.

11. The system according to claim 10, wherein said logical consistency relations are each expressed as an associated equation.

12. The system according to claim 10, in which a user interaction results in a modification of a variable object, a subset of said objects including a lowest hierarchical level being updated directly on a basis of said modification, a boundary between said incremental objects being updated in said top-down updating step and said updated directly objects being formed by variable incremental objects.

13. The system according to claim 10, in which incremental objects comprise a value field, a caller list, an environment field and an evaluator field, and wherein variable incremental objects consist essentially of a value field and a caller list.

14. The system according to claim 13, in which at least one incremental object comprises a closure object consisting essentially of an environment field and an evaluator field.

15. The system according to claim 13, in which at least one incremental object comprises a side-effect incremental object consists essentially of a caller list, an environment field, an evaluator field and an undo field.

16. The system according to claim 10, further comprising means for presenting said display structure on a visual display device.

17. The system according to claim 16, wherein said display structure comprises at least one recursive graph cycle, characterized in that for each recursive graph cycle a lowest hierarchical level is defined, an object at said lowest hierarchical level being separated into an incremental object within said recursive graph cycle and a variable incremental object outside said recursive graph cycle, said user action resulting in a modification of said variable incremental object outside said recursive graph cycle.

18. The system according to claim 17, further comprising means for finding a fix point solution of a recursive set of equations $x_j = f_j(x_1 \ldots x_n)$, $1 \leq j \leq n$, represented by said display structure, wherein $x_j$ represents the value of an object within said cycle and n is the number of objects within said cycle.

19. A method as claimed in claim 1, further comprising the step of displaying information corresponding to said updated information display structure.

* * * * *